United States Patent [19]

Chappell

[11] 3,856,663

[45] Dec. 24, 1974

[54] OXYGEN-PROMOTED THERMAL HYDROCARBON CONVERSION PROCESSES

[75] Inventor: Gilford A. Chappell, Colonia, N.J.

[73] Assignee: Exxon Research and Engineering Company, Linden, N.J.

[22] Filed: July 5, 1973

[21] Appl. No.: 376,622

[52] U.S. Cl............ 208/209, 208/208 R, 208/254 H
[51] Int. Cl................................................ C10c 23/00
[58] Field of Search............. 208/208 R, 209, 254 H

[56] References Cited
UNITED STATES PATENTS

| | | | |
|---|---|---|---|
| 3,284,342 | 11/1966 | Nathan et al. | 208/208 R |
| 3,341,448 | 9/1967 | Ford et al. | 208/208 R |
| 3,719,589 | 3/1973 | Herbstman et al. | 208/208 R |

*Primary Examiner*—C. Davis
*Attorney, Agent, or Firm*—Llewellyn A. Proctor; John W. Ditsler; Jay Simon

[57] ABSTRACT

Hydrocarbons are thermally hydrodegasified, hydrodesulfurized and hydrodenitrogenated at temperatures ranging from 500°K. to 2,000°K. and pressures ranging from 0.1 to 100 atmospheres in the presence of small amounts of molecular oxygen. The oxygen is believed to promote the generation of reactive hydrogen atoms, making it possible to carry out the reactions at faster rates and lower temperatures than are possible in the absence of the oxygen.

23 Claims, No Drawings

OXYGEN-PROMOTED THERMAL HYDROCARBON CONVERSION PROCESSES

The present invention relates to hydrocarbon conversion reactions. More particularly, the invention relates to improved processes for thermally hydrodegasifying, hydrodesulfurizing, and hydrodenitrogenating hydrocarbon materials.

The desulfurization and denitrogenation of petroleum stocks make an important contribution to cleaner air. The increasing use of petroleum-based fuels in densely populated areas and the correspondingly increasing potential pollution problem make it necessary to develop new and more highly effective techniques for eliminating sulfur and nitrogen from these fuels. In addition, the processing of non-petroleum stocks such as shale oil and coal liquids will be vital in meeting our future energy requirements. These complex hydrocarbon mixtures contain a variety of contaminants, notably nitrogen and sulfur compounds, which must be removed.

It is well known to treat hydrocarbons with hydrogen to remove nitrogen and sulfur and to produce hydrocarbon gases such as methane. Known treatments include thermal and catalytic processes.

Typically, the thermal treatments are carried out in the absence of a catalyst under conditions which are more severe than used in catalytic treatments. The temperatures required for thermal treatments are, in general, so extreme as to make these processes impractical from a commercial standpoint.

The catalytic processes are likewise faced with inherent problems. The heterogeneous catalysts employed are susceptible to poisoning by a variety of impurities normally present in the feed stream. Among the most notable contaminants are sulfur and nitrogen compounds. Moreover, catalyst activity may be decreased by excess heat which acts to reduce the surface area of the catalyst by sintering. Additionally, because these reactions take place at the gas-solid or liquid-solid interface, there is a kinetic problem of bringing the reactant to the reaction site.

It is, therefore, an object of the present invention to provide methods for thermally hydrodegasifying, hydrodenitrogenating and hydrodesulfurizing hydrocarbon materials which avoid these and other disadvantages of the prior art.

It is another object of the present invention to provide methods for thermally hydrodegasifying, hydrodenitrogenating and hydrodesulfurizing hydrocarbon materials at temperatures lower than were heretofore thought possible.

These and other objects of the present invention are accomplished by the present invention which provides a process for thermally hydrodegasifying, hydrodenitrogenating, or hydrodesulfurizing a hydrocarbon material which comprises contacting the hydrocarbon material at reaction conditions with hydrogen, in the presence of a small amount of oxygen.

While not being bound by any particular theory, it is believed that oxygen promotes an increased rate of reaction by effectively converting hydrogen molecules to hydrogen radicals. Thus, a more complete conversion is obtained in the presence of oxygen.

Thermal hydrodegasification, hydrodesulfurization and hydrodenitrogenation processes are well known to the art; however, until the time of the present invention the reaction conditions required have generally been too severe to provide satisfactory commercial processes.

Thermal hydrodegasification involves reacting a hydrocarbon feed with hydrogen at elevated temperatures in the absence of a solid, heterogeneous catalyst to produce methane gas as a principal product. Reaction temperatures generally range from about 1,000°K. to 2,000°K., while pressures range from 50 atmospheres to 150 atmospheres, depending principally upon the hydrocarbon feed.

Thermal hydrodenitrogenation involves reacting a nitrogen-containing hydrocarbon feed with hydrogen at elevated temperatures in the absence of a solid, heterogeneous catalyst to remove the nitrogen. According to this process, the nitrogen-containing hydrocarbon feed is hydrocracked to ammonia or nitrogen and light hydrocarbons. Reaction temperatures generally range from about 1,000°K. to 2,000°K., while pressures have generally been within the range of from about 50 atmospheres to 150 atmospheres, both temperature and pressure depending upon the particular feed and the degree of reaction desired.

Thermal hydrodesulfurization involves reacting a sulfur-containing hydrocarbon feed with hydrogen at elevated temperatures in the absence of a solid, heterogeneous catalyst to remove the sulfur. According to this process, the sulfur-containing hydrocarbon feed is hydrocracked to hydrogen sulfide and light hydrocarbons. Reaction temperatures of from 1,000°K. to 2,000°K. and pressures of from 50 atmospheres to 150 atmospheres are usual and generally vary within these ranges depending upon the particular hydrocarbon feed employed.

The present invention is particularly useful for treating high sulfur and/or nitrogen-containing stocks. These compounds have deleterious effects on the solid catalysts now used in the art, but would not affect the practice of the above invention because: (1) there are no reactive sites that can be poisoned; and (2) the oxygen is continually being added to the reaction mixture at a rate that results in the continuous presence of a proper amount of oxygen to promote hydrogenation over and above the oxygen consumed in reactions with the nitrogen and sulfur compounds.

According to this invention, the rate of reaction is increased by thermally reacting a hydrocarbon feed in the presence of an effective promoting amount of oxygen. While extremely small amounts of oxygen are effective, amounts of from about 0.01 to 6.0 mole percent oxygen are particularly effective, with 0.05 to 3.0 mole percent being preferred and 0.1 to 1.0 mole percent being most preferred. The oxygen can be introduced into the reaction zone as such or as one component of a gas mixture. The oxygen and hydrogen can be premixed prior to entering the reaction zone or brought to the reaction zone separately. The use of small amounts of oxygen in relation to the hydrogen is contemplated in the practice of this invention. The hydrogen-oxygen ratio should be set with a consideration of safety problems, since it is known that certain mixtures can explode violently. In general, a hydrogen-oxygen mole ratio of from about 100,000 to 6 can be used, while a hydrogen-oxygen mole ratio of from about 10,000 to 16 is preferred, with a hydrogen-oxygen mole ratio of 100 to 16 still more preferred.

The hydrocarbon can be introduced into the reaction zone in the form of a liquid or a gas, with the gaseous state being preferred. The temperature at which the reaction is carried out can vary from 500°K. to 2,000°K., with a temperature range of from 600°K. to 1,600°K. being preferred. The pressure at which the reaction is carried out can vary from .1 to 100 atmospheres, with a pressure range of from 1 to 15 atmospheres being preferred.

In general, most hydrocarbons can be employed as feedstocks in the practice of this invention. Most saturated and unsaturated aliphatic and aromatic hydrocarbons may be employed, including most hydrocarbon fractions and virgin crude. Particularly important feedstocks are those having high sulfur and/or nitrogen contents such as heavy oils including petroleum crude oils and petroleum residuum fractions. Other feeds familiar to the petroleum industry such as coal, shale oil and tarsand can also be processed according to the present invention. These feeds can be used as such or after preliminary processing such as thermal or catalytic cracking.

Although this process can be run batch-to-batch, it is contemplated that it will be continuous or semi-continuous. Reactors that are familiar to the art such as heated flow and static reactors are adequate. It will be necessary to determine optimum conditions for reacting each of the various feeds with a consideration of the type and dimensions of the reactor that will be used and the desired product characteristics. Hydrocarbon-hydrogen contact times will be determined for each specific case and can vary from one millisecond to a few minutes.

The following examples are presented for the purpose of illustrating the invention and should not be taken as limiting with regard to reaction conditions or materials. Unless otherwise indicated below, all parts and percentages are on a molar basis.

EXAMPLE 1

A. This experiment is run using a single-pulse shock tube. This device is capable of generating a well-defined reaction environment at very high temperatures, thus being suited for the study of gaseous reactions. The dwell or reaction time is approximately one millisecond which precludes wall effects. In the following studies the temperatures are set at 100°K. intervals ranging from 1,300°K. to 1,700°K. with a total pressure of 13 atmospheres. The reaction mixture consists of 0.2 mole percent thiophene, as a model sulfur-containing compound; 25 mole percent hydrogen; 74.46 mole percent argon; and 0.34 mole percent xenon, for mass balance purposes.

Basically the stock tube is a stainless steel pipe 18 feet long with a three-inch inside diameter. The tube is divided into two sections (6 feet and 12 feet) by an aluminum diaphragm of 0.016 inches thickness. The aluminum disc has two perpendicular grooves of fixed depth milled into the surface to control the pressure differential at which the diaphragm will rupture. In a typical experiment the tube is evacuated to 0.05 Torr, then the twelve-foot reaction section is pressurized with the reactant mixture to a predetermined value (e.g., 300 to 800 Torr). Finally, the six-foot driver section is pressurized with helium until the diaphragm bursts. At this point, a shock wave forms and travels down the reaction section to compress and heat the gaseous mixture. Since the end of the reaction section is closed, the shock wave reflects off the endplate and travels back into the already heated gas. This additional heating raises the temperature of the reactant gas to the preselected reaction temperature. Thus, the reactions of interest occur behind the reflected shock wave. The temperature rise is essentially instantaneous. As the shock wave is initiated, an expansion or rarefaction wave forms which moves in the opposite direction. After this wave reflects from the closed end of the driver section, it moves down the tube behind the shock wave and eventually intersects the reflected shock wave. The result is a very rapid cooling and quenching of the hot reaction zone. Initial cooling rates are of the order of $10^5$°K. per second. The net effect is a reaction time of approximately 1 millisecond. Pressure data are obtained via three quartz piezoelectric transducers fitted directly into the shock tube. After removing the gaseous products from the shock tube, the exact composition was determined by use of the gas chromatograph. $H_2S$ production was not measured in this Example. The results are summarized in Tables I and II below.

B. The procedure of Part A of this Example is repeated, but this time 0.1 mole percent of oxygen is added to the reaction mixture in place of a like amount of argon. The results are summarized in Tables I and II below.

The effect of oxygen on the hydrocracking of thiophene is shown in Table I.

TABLE I

| | Percent *Conversion of Thiophene | | | | |
|---|---|---|---|---|---|
| | 1300°K. | 1400°K. | 1500°K. | 1600°K. | 1700°K. |
| Example 1A ($H_2$) | 10 | 35 | 69 | 87 | 93 |
| Example 1B ($H_2+O_2$) | 25 | 50 | 77 | 90 | 94 |

*Thiophene which disappeared.

The major effect of the oxygen is observed at the lower temperatures. For example, at 1,300°K., 10 mole percent of the thiophene reacts in the presence of hydrogen, whereas the addition of only 0.1 mole percent of oxygen increases the conversion by 150%.

The influence of oxygen on methane production is illustrated by the data summarized below in Table II.

TABLE II

| | Moles of Methane Produced Per 100 Moles Thiophene | | | | |
|---|---|---|---|---|---|
| | 1300°K. | 1400°K. | 1500°K. | 1600°K. | 1700°K. |
| Example 1A ($H_2$) | Trace | 11 | 39 | 66 | 82 |
| Example 1B ($H_2+O_2$) | 12 | 35 | 74 | 81 | 84 |

Again the influence of oxygen is most pronounced at lower temperatures where, at 1,400°K., the methane yield is increased by 200% by the addition of oxygen.

EXAMPLE 2

A. In order to provide information at lower temperatures with longer dwell time, a simple flow reactor system in the form of a quartz tube reactor heated by an electric furnace is employed. The tube has three thermocouples fixed to the outside wall which indicate an approximate, essentially flat temperature profile. Data is obtained at 100°K. intervals within the range of from 950°K. to 1,250°K. The heated portion of the tube is 70 cm. long and 1 cm. in diameter. The volume flow rates are adjusted to give the desired average residence time of approximately six seconds. The feed mixtures are made up in steel storage tanks at 50 psig.

A feed containing 1.0 mole percent thiophene, an amount of xenon for mass balance purposes of about one mole percent, and the remainder hydrogen is fed to the flow reactor at a reaction pressure of 1 atmosphere. The results are summarized in Tables III and IV below.

B. The procedure of Part A of this Example is repeated, but this time 0.1 mole percent of the hydrogen is replaced by oxygen. The results are summarized below in Tables III and IV.

C. The procedure of Part A of this Example is again repeated, but this time 1.0 mole percent of the hydrogen is replaced by oxygen. The results are summarized below in Tables III and IV.

TABLE III

Percent of Total Feed Sulfur Removed as $H_2S$

|  | 950°K. | 1050°K. | 1150°K. | 1250°K. |
|---|---|---|---|---|
| Example 2A | 0 | 0 | 9 | 45 |
| Example 2B | 2.5 | 10 | 35 | 60 |
| Example 2C | 9 | 27 | 60 | 70 |

TABLE IV

Percent Conversion of Thiophene

|  | 950°K. | 1050°K. | 1150°K. | 1250°K. |
|---|---|---|---|---|
| Example 2A | 0 | 0 | 35 | 100 |
| Example 2B | 11 | 25 | 95 | 100 |
| Example 2C | 40 | 90 | 100 | 100 |

The results show a pronounced oxygen effect. At 1,050°K. the conversion of thiophene increased from 0% to 90% as the additive ranged from 0% to 1%. It was additionally found that a portion of the original sulfur ended up as carbon disulfides, which is somewhat surprising. This product may have resulted from a surface catalyzed reaction. It is also observed that the rate of conversion to methane accelerated with oxygen addition. This is consistent with the overall increase in the rate of hydrocracking.

While the mechanism by which oxygen promotes the hydrocracking and desulfurization of thiophene is uncertain, it is presently believed, without wanting to be bound to any theory, that the rate of hydrogen atom formation will accelerate owing to the chain-branching reaction between $H_2$ and $O_2$.

$H. + O_2 \leftrightarrows OH. + O.$
$O. + H_2 \leftrightarrows OH. + H.$
$2OH. + 2H_2 \leftrightarrows 2H_2O + 2H$ Therefore, for each hydrogen atom which reacts with $O_2$, three H atoms are generated. The H atom concentration will increase very rapidly after the oxidation of hydrogen ensues. These atoms may then effect the hydrogenation of a material such as thiophene to dihydrothiaphene, followed by hydrocracking to $H_2S$ and light hydrocarbons. It is noted that water or steam injected into the reaction zone do not produce this promotion effect.

Because the basic chemistry for hydrodenitrogenation is similar to that for hydrodesulfurization similar good results can be obtained by thermally hydrodenitrogenating a hydrocarbon feed using oxygen as a promoter.

This invention provides several advantages. Oxygen can be mixed homogeneously with hydrogen, thereby eliminating the various difficulties that have been experienced with heterogeneous catalysts, i.e., poisoning of the surface by impurities in the reactants, kinetic problems of bringing the reactants to the reactive site of the catalyst, etc. Another advantage is the flexibility of the instant process in that reaction rates can be easily controlled by variation of the oxygen concentration. A still further advantage would be one of economics, since oxygen is less costly than the prior art catalysts.

What is claimed is:

1. In a process for thermally hydrotreating a hydrocarbon feed by contacting said hydrocarbon feed with hydrogen under thermal hydrotreating reaction conditions the improvement which comprises effecting the hydrotreating in the presence of an effective amount of oxygen thereby promoting the hydrotreating process.

2. A process according to claim 1 wherein the oxygen is present in an amount of from 0.01 mole percent to 6.0 mole percent of the reaction mixture.

3. A process according to claim 1 wherein the hydrotreating step involves hydrodegasifying a hydrocarbon feed under reaction conditions comprising a temperature within the range of from 500°K. to 2000°K and a pressure within the range of from 0.1 atmospheres to 100 atmospheres.

4. A process according to claim 3 wherein the oxygen is present in an amount of from 0.01 mole percent to 6.0 mole percent of the reaction mixture.

5. A process according to claim claim wherein the oxygen is present in an amount of from 0.05 to 3.0 mole percent. 500°2000°0.1 100

6. A process according to claim 3 wherein the oxygen is present in an amount of from 0.1 to 1 mole percent.

7. A process according to claim 6 wherein the hydrocarbon feed contains thiophene.

8. A process according to claim 6 wherein the hydrocarbon feed comprises a material selected from the group consisting of crude oil, shale oil, coal and petroleum residuum.

9. A process according to claim 6 wherein the hydrocarbon feed comprises the product formed by thermally or catalytically cracking a material selected from the group consisting of crude oil, shale oil, coal and petroleum residuum.

10. A process according to claim 1 wherein the hydrotreating step involves hydrodesulfurizing a hydrocarbon feed under reaction conditions comprising a temperature within the range of from 500°K to 2,000°K and a pressure within the range of from 0.1 atmosphere to 100 atmospheres.

11. A process according to claim 10 wherein the oxygen is present in an amount of from 0.01 mole percent to 6.0 mole percent of the reaction mixture.

12. A process according to claim 10 wherein the oxygen is present in an amount of from 0.05 to 3 mole percent.

13. A process according to claim 10 wherein the oxygen is present in an amount of from 0.1 to 1.0 mole percent.

14. A process according to claim 13 wherein the hydrocarbon feed contains thiophene.

15. A process according to claim 13 wherein the hydrocarbon feed comprises a material selected from the group consisting of crude oil, shale oil, coal and petroleum residuum.

16. A process according to claim 13 wherein the hydrocarbon feed comprises the product formed by thermally or catalytically cracking a material selected from the group consisting of crude oil, shale oil, coal and petroleum residuum.

17. A process according to claim 1 wherein the hydrotreating step involves hydrodenitrogenating a hydrocarbon feed under reaction conditions comprising a temperature within the range of from 500°K to 2,000°K and a pressure within the range of from 0.1 atmosphere to 100 atmospheres.

18. A process according to claim 17 wherein the oxygen is present in an amount of from 0.01 mole percent to 6.0 mole percent of the reaction mixture.

19. A process according to claim 17 wherein the oxygen is present in an amount of from 0.05 to 3.0 mole percent.

20. A process according to claim 17 wherein the oxygen is present in an amount of from 0.1 to 1.0 mole percent.

21. A process according to claim 20 wherein the hydrocarbon feed contains thiophene.

22. A process according to claim 20 wherein the hydrocarbon feed comprises a material selected from the group consisting of crude oil, shale oil, coal and petroleum residuum.

23. A process according to claim 20 wherein the hydrocarbon feed comprises the product formed by thermally or catalytically cracking a material selected from the group consisting of crude oil, shale oil, coal and petroleum residuum.

* * * * *